United States Patent
Persson et al.

(10) Patent No.: US 9,394,993 B2
(45) Date of Patent: Jul. 19, 2016

(54) PARK LOCK MECHANISM

(71) Applicant: e-AAM Driveline Systems AB, Trollhättan (SE)

(72) Inventors: Martin Persson, Trollhättan (SE); Lars U. Larsson, Trollhättan (SE); Gabriel Trönnberg, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 16 days.

(21) Appl. No.: 14/475,626

(22) Filed: Sep. 3, 2014

(65) Prior Publication Data

US 2016/0061322 A1    Mar. 3, 2016

(51) Int. Cl.
| | |
|---|---|
| *F16H 63/34* | (2006.01) |
| *B60T 1/06* | (2006.01) |
| *B60T 1/00* | (2006.01) |

(52) U.S. Cl.
CPC ............ *F16H 63/3433* (2013.01); *B60T 1/005* (2013.01); *F16H 63/3466* (2013.01)

(58) Field of Classification Search
CPC ............ F16H 63/3425; F16H 63/3433; F16H 63/3466
USPC ...................................................... 192/219.5
See application file for complete search history.

(56) References Cited

U.S. PATENT DOCUMENTS

| | | | | |
|---|---|---|---|---|
| 4,518,066 | A | * | 5/1985 | Barr ........................ B60T 1/005 188/31 |
| 4,576,261 | A | * | 3/1986 | Barr ........................ B60T 1/005 192/219.5 |
| 5,429,212 | A | | 7/1995 | Schlosser |
| 5,807,205 | A | | 9/1998 | Odaka et al. |
| 6,074,321 | A | | 6/2000 | Maeda et al. |
| 6,692,394 | B2 | | 2/2004 | Takenaka |
| 7,448,978 | B2 | | 11/2008 | Habel |
| 7,861,839 | B2 | * | 1/2011 | Schweiher .......... F16H 63/3433 192/220.2 |
| 2005/0159861 | A1 | | 7/2005 | Iwatsuki et al. |
| 2007/0125619 | A1 | * | 6/2007 | Berger ................... B60T 1/005 192/219.5 |
| 2011/0094806 | A1 | | 4/2011 | Mack et al. |
| 2012/0058855 | A1 | | 3/2012 | Sten |

* cited by examiner

*Primary Examiner* — Richard Lorence
(74) *Attorney, Agent, or Firm* — Harness, Dickey & Pierce, P.L.C.

(57) ABSTRACT

A park lock having a cam that is movable along a movement axis to cause corresponding pivotable movement of a pawl relative to a dog ring. The park lock mechanism includes a first actuator assembly and a second actuator assembly. The first actuator assembly has a first output member on which the cam is slidably mounted. The second actuator assembly includes a detent mechanism, which is configured to resist movement of the cam relative to the first output member, and a biasing element that is configured to store energy. Operation of the detent mechanism to permit movement of the cam relative to the first output member employs the stored energy in the biasing element to translate the cam on the first output member.

15 Claims, 5 Drawing Sheets

PARK LOCK MECHANISM

FIELD

The present disclosure relates to a park lock mechanism.

BACKGROUND

This section provides background information related to the present disclosure which is not necessarily prior art.

Park lock mechanisms are commonly integrated into transmissions and vehicle driveline components and help to immobilize a vehicle when the vehicle is parked and not in use. Known park lock mechanism typically include a dog ring, which is coupled to a rotatable component of the driveline component for common rotation, and a pawl that is selectively engagable with the dog ring. While the known park lock mechanisms are suitable for their intended purpose, they nevertheless remain susceptible to improvement.

SUMMARY

This section provides a general summary of the disclosure, and is not a comprehensive disclosure of its full scope or all of its features.

In one form, the present teachings provide a park lock mechanism for a vehicle driveline component having a rotatable member. The park lock mechanism includes a housing, a dog ring, a pawl, a pawl spring, a cam follower, a cam, a first actuator assembly, and a second actuator assembly. The dog ring is configured to be coupled to the rotatable member for common rotation. The dog ring is received in the housing and includes a plurality of circumferentially spaced apart teeth. The pawl has a pawl tooth and is pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing. The pawl spring biases the pawl toward the first pivot position. The cam follower is mounted to the pawl for movement therewith about the pivot axis. The cam is movable along a movement axis and contacts the cam follower. The cam has a first cam portion and a second cam portion. Positioning of the cam in a first cam position along the movement axis places the first cam portion on the cam follower to thereby position the pawl in the first pivot position. Positioning of the cam in a second cam position along the movement axis places the second cam portion on the cam follower to thereby position the pawl in the second pivot position. The first actuator assembly has a first output member that is movable along the movement axis between a first output member position and a second output member position. The cam being slidably mounted to the first output member. The second actuator assembly has a biasing element, a detent mechanism and a second output member. The biasing element biases the cam on the first output member in a predetermined direction along the movement axis. The detent mechanism has a stop member that is movable between a first detent position and a second detent position. The stop member cooperates with the cam to store energy in the biasing element when the stop member is in the first detent position. The second output member is configured to selectively move the stop member from the first detent position to the second detent position.

In another form, the present teachings provide a park lock mechanism for a vehicle driveline component that has a rotatable member. The park lock mechanism includes method for inhibiting rotation of a rotatable member of a vehicle driveline component. The method includes: coupling a dog ring to the rotatable member, the dog ring having a plurality of circumferentially spaced apart teeth; pivotally mounting a pawl for movement above a pivot axis between a first pivot position, in which a pawl tooth of the pawl is disengaged from the teeth of the dog ring so as not to impede rotation of the dog ring, and a second pivot position in which the pawl tooth engages the teeth of the dog ring so as to impede rotation of the dog ring; biasing the pawl toward the first pivot position; providing a cam follower on the pawl; mounting a cam for translation along a movement axis between a first cam position and a second cam position, the cam contacting the cam follower and including a first cam portion and a second cam portion, wherein positioning of the cam in the first cam position orients the first cam portion on the cam follower to thereby position the pawl in the first pivot position, and wherein positioning of the cam in the second cam position orients the second cam portion on the cam follower to thereby position the pawl in the second pivot position; providing first and second actuator assemblies, the first actuator assembly having a first output member, the second actuator assembly having a detent mechanism, the cam being slidably mounted on the first output member, the detent mechanism having a stop member in contact with the cam to inhibit movement of the cam in a first direction along the first output member; operating the first actuator assembly to move the first output member from a first output member position to a second output member position to thereby drive the cam from the first cam position to the second cam position; operating the first actuator assembly to move the first output member from the second output member position to the first output member position to thereby drive the cam from the second cam position to the first cam position; and operating the second actuator assembly to move the stop member to permit the cam to be moved on the first output member in the predetermined direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
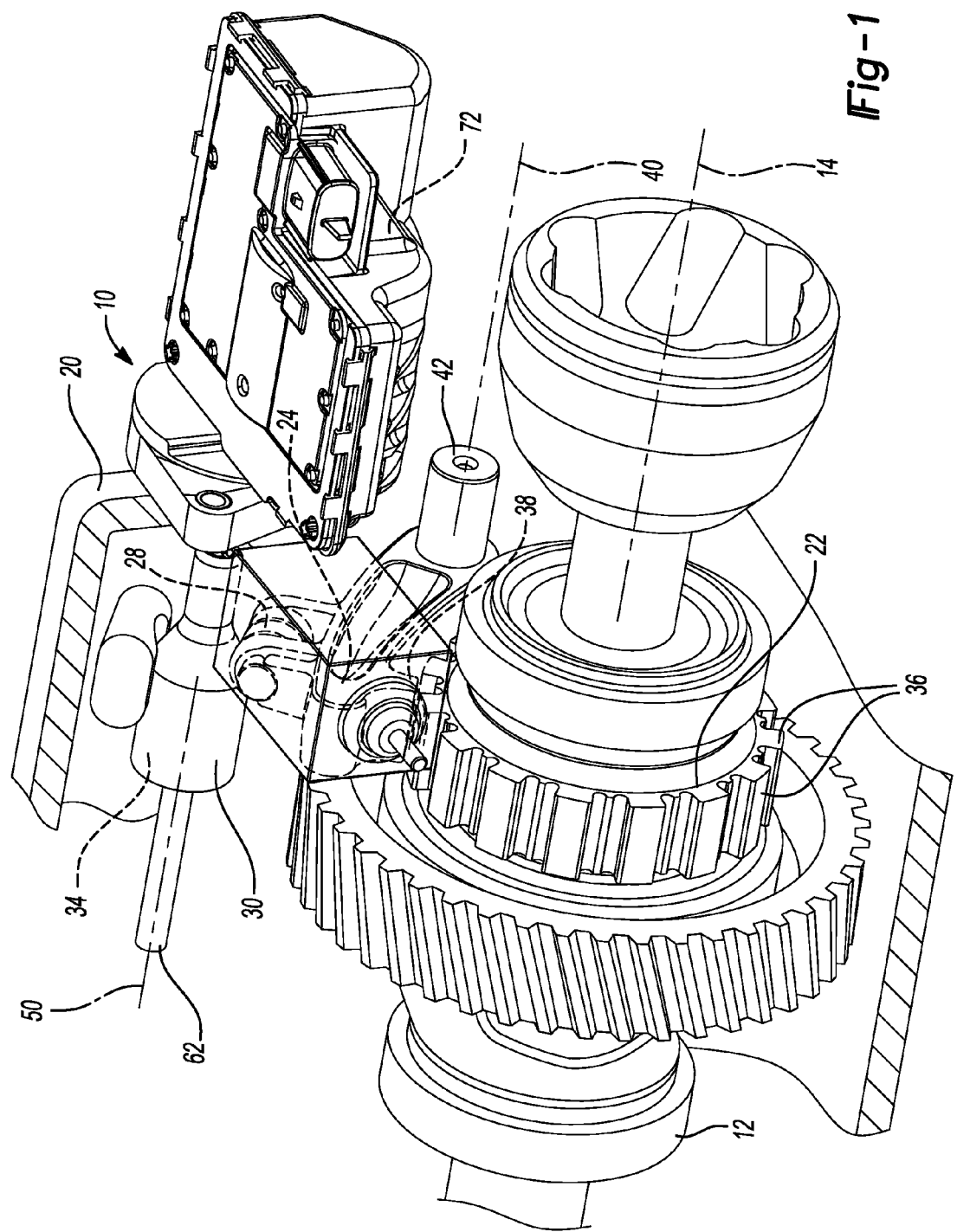
FIGS. 1 and 2 are perspective views of a portion of a driveline component having a park lock mechanism constructed in accordance with the teachings of the present disclosure.
Figure 2:
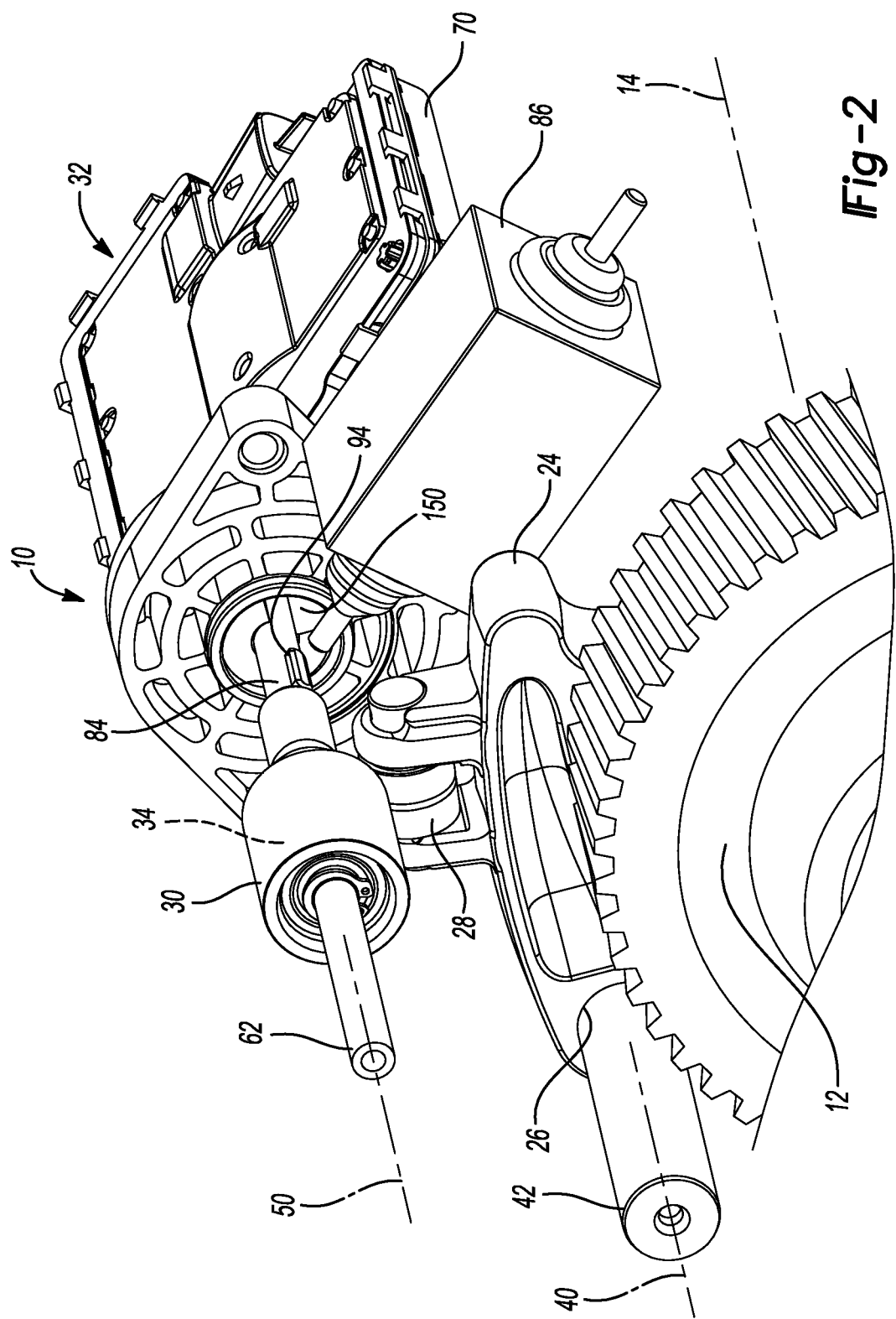

With reference to FIGS. 1 and 2 of the drawings, a park lock mechanism 10 constructed in accordance with the teachings of the present disclosure is shown in operative association with an exemplary vehicle driveline component 12. In the particular example provided, the driveline component 12 is a differential case that is rotatable about a driven axis 14, but those of skill in the art will appreciate that other rotatable elements of a driveline component could be employed in the alternative.

The park lock mechanism 10 can comprise a housing 20, a dog ring 22, a pawl 24, a pawl spring 26, a cam follower 28, a cam 30, a first actuator assembly 32 and a second actuator assembly 34. The housing 20, the dog ring 22, the pawl 24 and the pawl spring 26 can be configured in a conventional and well known manner and as such, these components need not be described in significant detail herein. Briefly, the housing 20 can be configured to house a portion of the park lock mechanism 10 and can optionally be configured to house the vehicle driveline component 12. In the example provide, the housing 20 houses portions of the park lock mechanism 10 as well as components associated with a drive module of the type that is disclosed in commonly assigned U.S. Pat. No. 8,663,051 entitled "Axle Assembly With Torque Distribution Drive Mechanism", the disclosure of which is incorporated by reference as if fully set forth in detail herein. The dog ring 22 can be an annular structure that can define a plurality of circumferentially spaced apart teeth 36. The dog ring 22 can be mounted to the driveline component 12 for common rotation about the driven axis 14. The pawl 24 can have a pawl tooth 38 and can be mounted to the housing 20 for pivoting motion about a pivot axis 40 between a first pivot position, in which the pawl tooth 38 is disengaged from the teeth 36 of the dog ring 22 so as to not impede rotation of the dog ring 22 relative to the housing 20, and a second pivot position in which the pawl tooth 38 engages the teeth 36 of the dog ring 22 so as to impede rotation of the dog ring 22 relative to the housing 20. The pivot axis 40 can be parallel to the driven axis 14. In the example provided, the pawl 24 is fixedly mounted on a cylindrically-shaped rail 42 that is non-rotatably coupled to the housing 20. The pawl spring 26 is configured to bias the pawl 24 toward the first pivot position. In the example provided, the pawl spring 26 is a torsion spring that is mounted to the rail 42 and engaged to the housing 20.

The cam follower 28 can be coupled to the pawl 24 for movement therewith about the pivot axis 40. In the example provided, the cam follower 28 is a roller that is rotatably mounted to the pawl 24.

Figure 3:
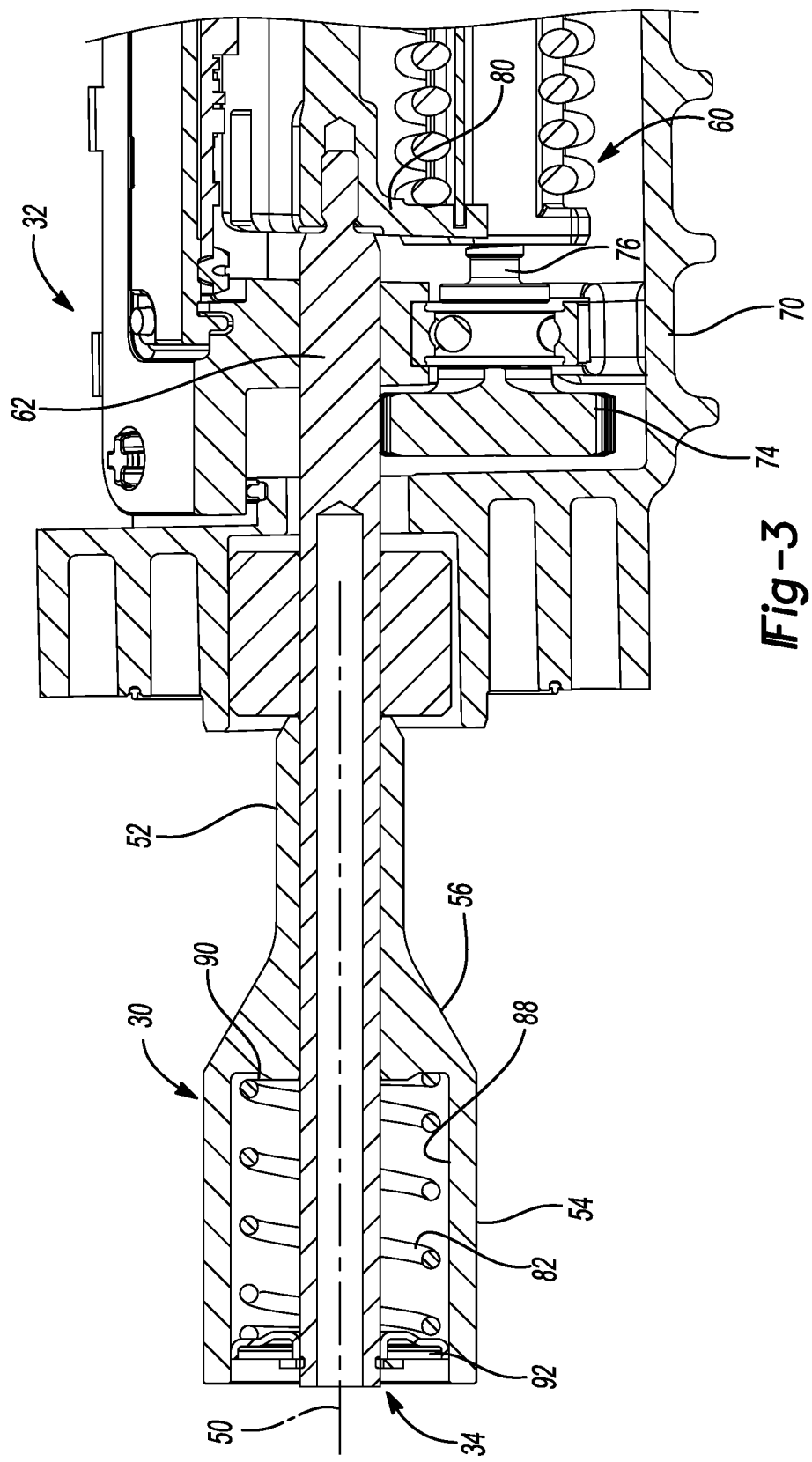
FIG. 3 is a section view of the portion of the driveline component of FIG. 1 taken through a portion of the park lock mechanism along a movement axis.

With reference to FIGS. 2 and 3, the cam 30 can be movable along a movement axis 50, which can be parallel to the pivot axis 40, between a first cam position and a second cam position. The cam 30 is configured to contact the cam follower 28 and includes a first cam portion 52, a second cam portion 54 and a transition portion 56 between the first and second cam portions 52 and 54. The first cam portion 52 can be cylindrically shaped and sized to cause the pawl 24 to be positioned in the first pivot position when the first cam portion 52 is positioned in contact with the cam follower 28 (i.e., when the cam 30 is in the first cam position). The second cam portion 54 can be cylindrically shaped and sized to cause the pawl 24 to be positioned in the second pivot position when the second cam portion 54 is positioned in contact with the cam follower 28 (i.e., when the cam 30 is in the second cam position).

The first actuator assembly 32 can be any type of linear actuator and can comprise a first linear motor 60 having a first output member 62 that is movable along the movement axis 50 between a first output member position and a second output member position. The first linear motor 60 can be configured in any desired manner, such as the actuator that is described in U.S. Provisional Patent Application No. 61/869,292 filed Aug. 23, 2012, the disclosure of which is incorporated by reference as if fully set forth in detail herein. Briefly, the first linear motor 60 can comprise a first actuator housing 70, a rotary motor 72 (FIG. 1), a transmission 74, a lead screw 76, a cradle assembly 80 and the first output member 62. The first actuator housing 70 is configured to be fixedly coupled to the housing 20 and can house desired portions of the first linear motor 60. The rotary motor 72 is fixedly coupled to the first actuator housing 70. The transmission 74 can be mounted to the first actuator housing 70 and can receive rotary power from the rotary motor 72. The lead screw 76 can be rotatably mounted to the first actuator housing 70 and can receive rotary power that is output from the transmission 74. The lead screw 76 can be oriented generally parallel to the movement axis 50. The cradle assembly 80 can be moved by the lead screw 76 in axial directions parallel to the movement axis 50. The first output member 62 can be fixedly coupled to the cradle assembly 80 for movement therewith.

The first output member 62 can comprise a cylindrical rod-shaped structure that can be disposed coaxially with the cam 30. In the particular example provided, the cam 30 is slidably and concentrically mounted on the first output member 62.

The second actuator assembly 34 can be any type of linear actuator that is configured to store (and selectively release) mechanical energy to move the cam 30 on the first output member 62 in one or more predetermined situations. In the present example provided, the second actuator assembly 34 is configured to selectively release mechanical energy to move the cam 30 on the first output member 62 from the first cam position to the second cam position when the first output member 62 is in the first output member position. The second actuator assembly 34 can comprise a biasing element 82, a detent mechanism 84 and a second actuator 86. The biasing element 82 can be configured to generate an axially directed force that is applied to drive the cam 30 from the first cam position to the second cam position.

With specific reference to FIG. 3, the biasing element 82 can be a helical coil spring that can be disposed radially and coaxially about the first output member 62 and axially between the first output member 62 and the cam 30. The biasing element 82 can be received in a bore 88 formed in the cam 30 and can be disposed axially between a shoulder 90, which can be formed on the cam 30, and a keeper 92 that can be fixedly coupled to the first output member 62.

Figure 4:
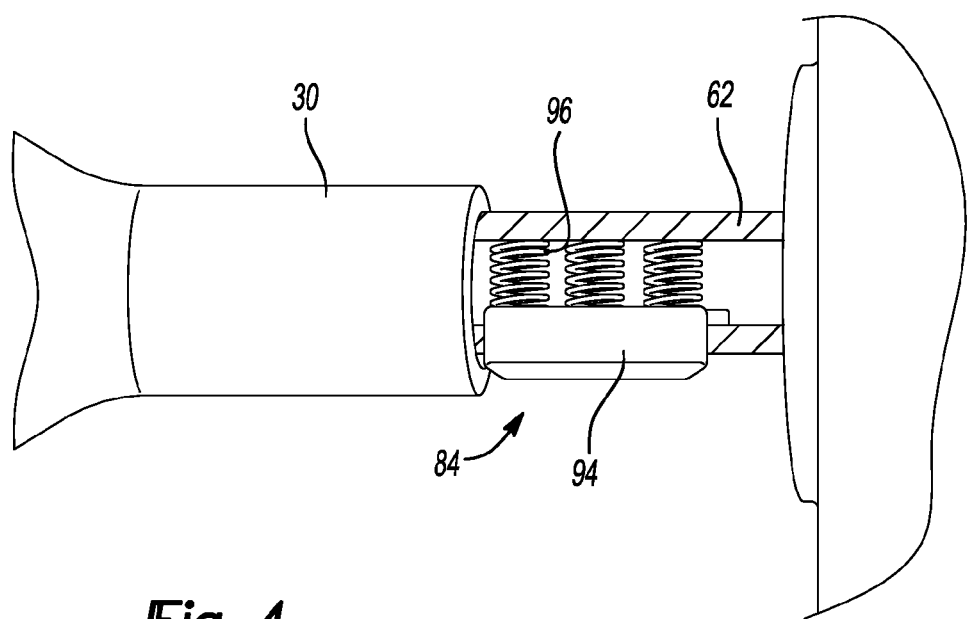
FIG. 4 is a sectional view of a portion of the driveline component of FIG. 1 illustrating a detent mechanism associated with a second actuator assembly.

With reference to FIG. 4, the detent mechanism 84 can be coupled to the first output member 62 and can be configured to selectively inhibit movement of the cam 30 from the first cam position toward the second cam position. The detent mechanism 84 can comprise a stop member 94 and one or more detent springs 96. The stop member 94 can be mounted to the first output member 62 for movement in a radial direction relative to the first output member 62 between a first detent position and a second detent position that is radially inwardly of the first detent position. The detent spring(s) 96 can be disposed between the first output member 62 and the stop member 94 and can bias the stop member 94 toward the first detent position. The stop member 94 can be disposed in-line with the cam 30 so that the biasing element 82 (FIG. 3) causes an end face of the cam 30 to contact the stop member 94 when the stop member 94 is in the first detent position. It will be appreciated that contact between the stop member 94 and the end face of the cam 30 will inhibit movement of the cam 30 relative to the first output member 62 in a direction that tends to unload the biasing element 82. Stated another way, contact between the end face of the cam 30 and the stop member 94 permits to be stored in the biasing element 82. It will be further appreciated that placement of the stop member 94 in the second detent position permits the cam 30 to slide on the first output member 62 so as to at least partly unload the biasing element 82.

Figure 5:
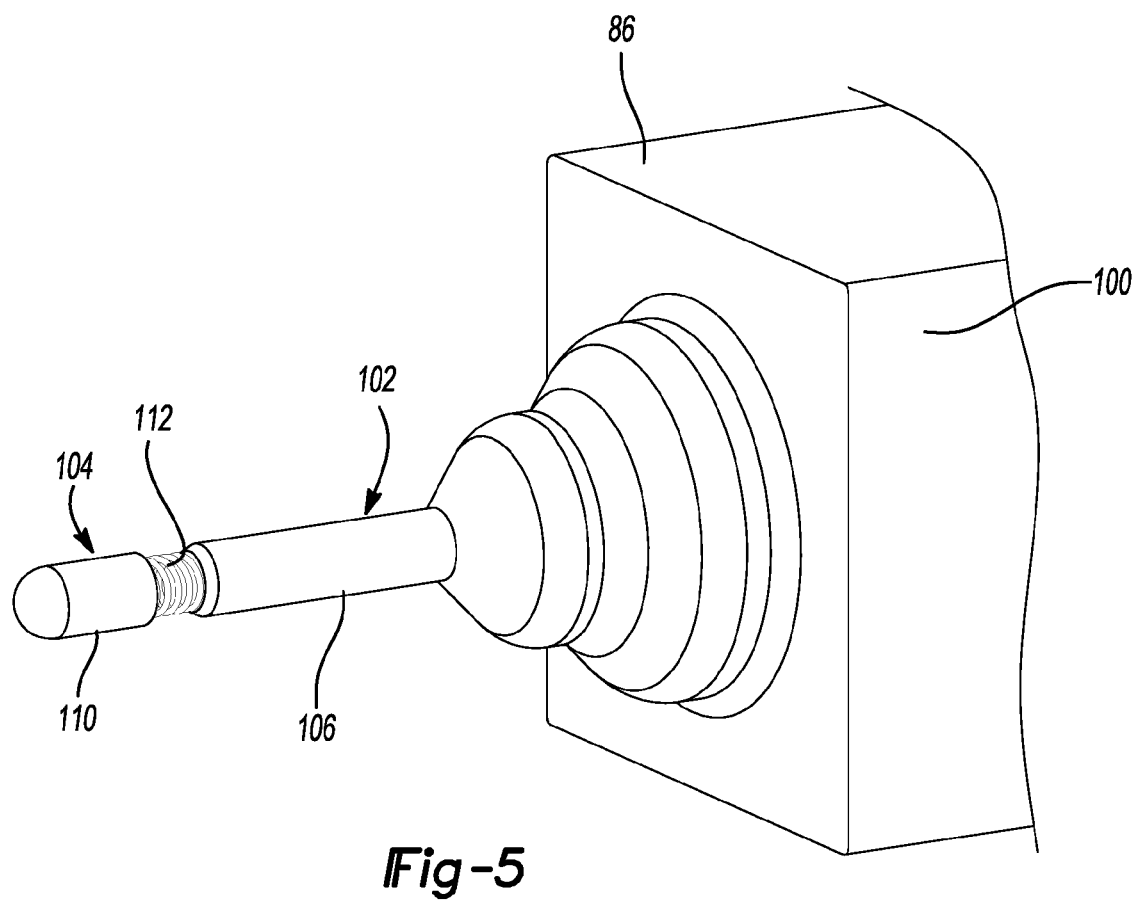
FIG. 5 is a perspective view of a portion of the driveline component of FIG. 1 illustrating a second actuator associated with the second actuator assembly.

In FIGS. 2 and 5, the second actuator 86 can be any type of actuator that can selectively move the stop member 94 into the second detent position. In the particular example provided, the second actuator 86 comprises a linear motor 100 having a second output member 102 that can include a tip mechanism 104 that can be coupled to a shaft 106. The linear motor 100 can be any type of linear motor, such as a solenoid, and can be mounted to the housing 20 (FIG. 1) so that the second output member 102 is movable in a direction that is generally perpendicular to the movement axis 50. The tip mechanism 104 can comprise a plunger 110 and a plunger spring 112 that can movably couple the plunger 110 to the shaft 106.

Returning to FIGS. 1 and 2, the first actuator assembly 32 can be operated to translate the first output member 62 along the movement axis 50 to cause corresponding motion of the cam 30. When the stop member 94 is in the first detent position and abutted against the face of the cam 30 so that the biasing element 82 (FIG. 3) is under load, movement of the first output member 62 between the first and second output member positions can cause corresponding movement of the cam 30 between the first and second cam positions, respectively.

In FIGS. 2 through 4, the second actuator assembly 34 can be operated when the first output member 62 is in the first output member position and the stop member 94 is in the first detent member position and abutted against the face of the cam 30 so that the biasing element 82 is under load to retract the stop member 94 (i.e., move the stop member 94 to the second detent position) so that the biasing element 82 can move the cam 30 on the first output member 62 from the first cam position to the second cam position.

Figure 6:
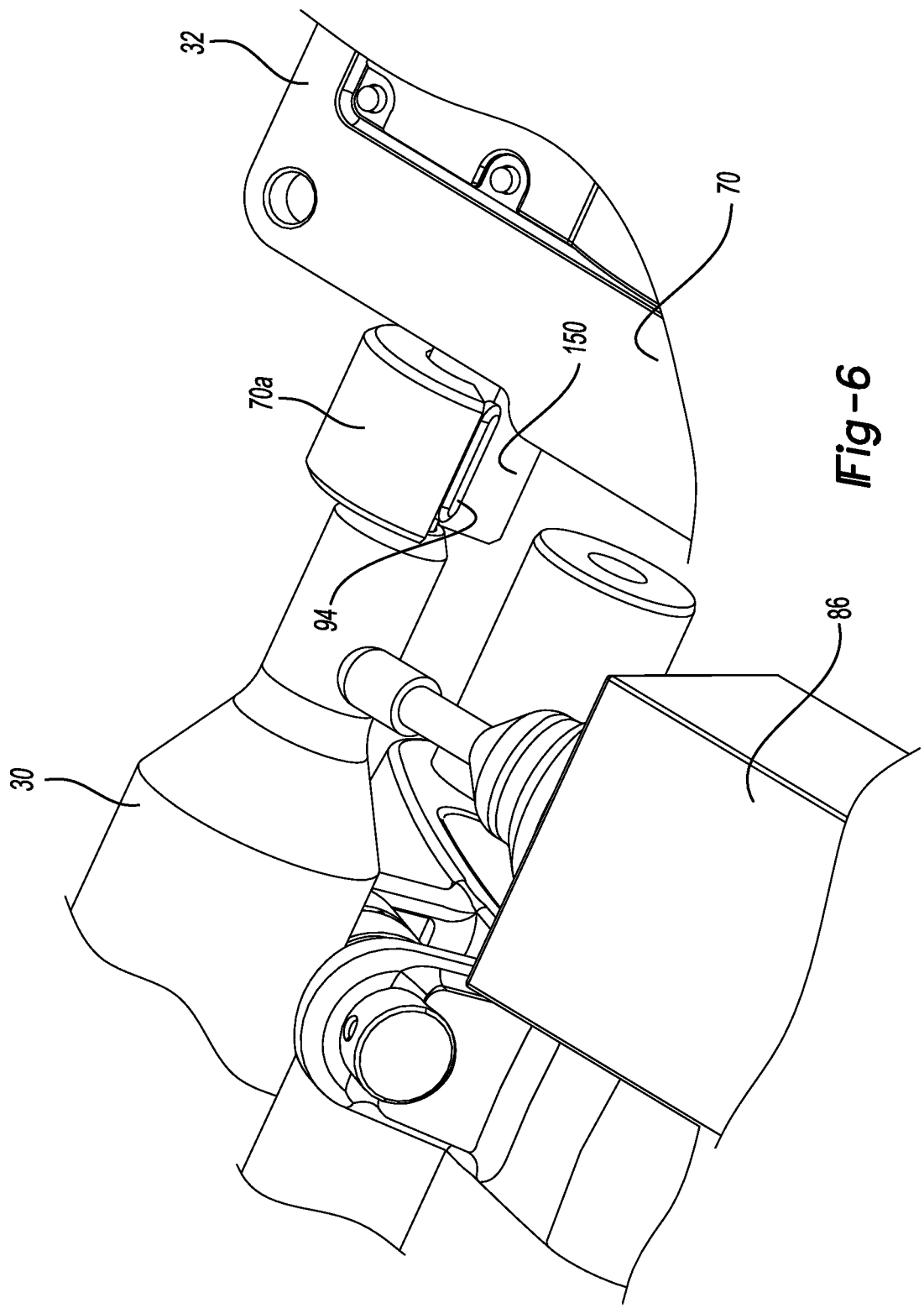
FIG. 6 is a perspective view of a portion of the driveline component of FIG. 1 illustrating the detent mechanism received in a slotted aperture in a housing.

In the particular example provided, the second actuator assembly 34 is not configured to return the cam 30 from the second cam position to the first cam position (and thereby load the biasing element 82). Rather, the first actuator assembly 34 is operated to move the first output member 62 to re-load the biasing element 82 and to re-set the detent mechanism 84. In this regard, the first actuator assembly 34 is operated to move the first output member 62 to the second output member position. The cam 30 can be maintained in the second cam position, for example through contact between the cam 30 and the housing 70 of the first actuator assembly 32. Placement of the first output member 62 in the second output member position when the cam 30 is in the second cam position permits the first output member 62 to be withdrawn from the cam 30 so that the stop member 94 can be moved into a slotted aperture 150 (shown in FIGS. 2 and 6) in a collar 70a formed in the housing 70. When the stop member 94 is disposed in the slotted aperture 150, the detent spring 96 can urge the stop member 94 radially outwardly into the first detent position such that the stop member 94 is disposed against the end face of the cam 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

| | |
|---|---|
| park lock mechanism | 10 |
| driveline component | 12 |
| driven axis | 14 |
| housing | 20 |
| dog ring | 22 |
| pawl | 24 |
| pawl spring | 26 |
| cam follower | 28 |
| cam | 30 |
| first actuator assembly | 32 |
| second actuator assembly | 34 |
| teeth | 36 |
| pawl tooth | 38 |
| pivot axis | 40 |
| rail | 42 |
| movement axis | 50 |
| first cam portion | 52 |
| second cam portion | 54 |
| transition portion | 56 |
| first linear motor | 60 |
| first output member | 62 |
| first actuator housing | 70 |
| collar | 70a |
| rotary motor | 72 |
| transmission | 74 |
| lead screw | 76 |
| cradle assembly | 80 |
| biasing element | 82 |
| detent mechanism | 84 |
| second actuator | 86 |
| bore | 88 |
| shoulder | 90 |
| keeper | 92 |
| stop member | 94 |
| detent spring | 96 |
| linear motor | 100 |
| second output member | 102 |
| tip mechanism | 104 |
| shaft | 106 |
| plunger | 110 |
| plunger spring | 112 |
| slotted aperture | 150 |

What is claimed is:

1. A park lock mechanism for a vehicle driveline component having a rotatable member, the park lock mechanism comprising:
   a housing;
   a dog ring that is adapted to be coupled to the rotatable member for common rotation, the dog ring being received in the housing and comprising a plurality of circumferentially spaced apart teeth;
   a pawl having a pawl tooth, the pawl being pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing;
   a pawl spring that biases the pawl toward the first pivot position;
   a cam follower mounted to the pawl for movement therewith about the pivot axis;
   a cam movable along a movement axis and contacting the cam follower, the cam having a first cam portion and a second cam portion, wherein positioning of the cam in a first cam position along the movement axis places the first cam portion on the cam follower to thereby position the pawl in the first pivot position, and wherein positioning of the cam in a second cam position along the movement axis places the second cam portion on the cam follower to thereby position the pawl in the second pivot position;

a first actuator assembly having a first output member that is movable along the movement axis between a first output member position and a second output member position, the cam being slidably mounted to the first output member; and a second actuator assembly having a biasing element, a detent mechanism and a second output member, the biasing element biasing the cam on the first output member in a predetermined direction along the movement axis, the detent mechanism having a stop member that is movable relative to the cam between a first detent position and a second detent position, the stop member engaging the cam to inhibit movement of the cam in the predetermined direction along the movement axis and store energy in the biasing element when the stop member is in the first detent position, the second output member being configured to selectively move the stop member from the first detent position to the second detent position.

2. The park lock mechanism of claim 1, wherein the second output member comprises a shaft and tip mechanism having a plunger and a spring that couples the plunger to the shaft.

3. The park lock mechanism of claim 1, wherein the stop member is mounted on the first output member.

4. The park lock mechanism of claim 1, wherein the detent mechanism comprises a detent spring that biases the stop member toward the first detent position.

5. The park lock mechanism of claim 4, wherein the detent spring biases the stop member radially outward relative to the first output member.

6. The park lock mechanism of claim 1, wherein the second actuator assembly comprises a linear motor.

7. The park lock mechanism of claim 6, wherein the linear motor comprises a solenoid.

8. The park lock mechanism of claim 1, wherein the first actuator assembly comprises a linear motor.

9. The park lock mechanism of claim 8, wherein the linear motor comprises a rotary motor that drives the first output member through a transmission.

10. The park lock mechanism of claim 1, wherein the biasing element is received in a bore in the cam.

11. The park lock mechanism of claim 1, wherein the stop member is coupled to the first output member for axial movement therewith.

12. The park lock mechanism of claim 11, wherein when the stop member is in the first detent position, the stop member is positioned more radially outward of the movement axis than when the stop member is in the second detent position.

13. A method for inhibiting rotation of a rotatable member of a vehicle driveline component, the method comprising:

coupling a dog ring to the rotatable member, the dog ring having a plurality of circumferentially spaced apart teeth;

pivotally mounting a pawl for movement about a pivot axis between a first pivot position, in which a pawl tooth of the pawl is disengaged from the teeth of the dog ring so as not to impede rotation of the dog ring, and a second pivot position in which the pawl tooth engages the teeth of the dog ring so as to impede rotation of the dog ring;

biasing the pawl toward the first pivot position;

providing a cam follower on the pawl;

mounting a cam for translation along a movement axis between a first cam position and a second cam position, the cam contacting the cam follower and including a first cam portion and a second cam portion, wherein positioning of the cam in the first cam position orients the first cam portion on the cam follower to thereby position the pawl in the first pivot position, and wherein positioning of the cam in the second cam position orients the second cam portion on the cam follower to thereby position the pawl in the second pivot position;

providing first and second actuator assemblies, the first actuator assembly having a first output member, the second actuator assembly having a detent mechanism, the cam being slidably mounted on the first output member, the detent mechanism having a stop member movable relative to the cam between a first detent position wherein the stop member is in contact with the cam to inhibit movement of the cam in a predetermined direction along the first output member, and a second detent position;

operating the first actuator assembly to move the first output member from a first output member position to a second output member position to thereby drive the cam from the first cam position to the second cam position;

operating the first actuator assembly to move the first output member from the second output member position to the first output member position to thereby drive the cam from the second cam position to the first cam position; and operating the second actuator assembly to move the stop member to the second detent position wherein the stop member permits the cam to be moved on the first output member in the predetermined direction.

14. The method of claim 13, wherein the second actuator assembly is operated to move the stop member only when the first output member is in the first output member position.

15. The method of claim 14, wherein after the second actuator assembly is operated to move the stop member and the cam is moved on the first output member in the predetermined direction, the method further comprises operating the first actuator assembly to move the first output member from the second output member position to the first output member position such that the stop member is moved into a position that couples the cam to the first output member in a manner that limits movement of the cam on the first output member in the predetermined direction.

* * * * *